United States Patent
Hoghoj et al.

(10) Patent No.: US 8,496,863 B2
(45) Date of Patent: Jul. 30, 2013

(54) METHOD FOR PRODUCING A REPLICATION MASTER, REPLICATION METHOD AND REPLICATION MASTER

(75) Inventors: Peter Hoghoj, Saint-Martin-le-Vinoux (FR); Ralf Siebrecht, Les Adrets (FR); Sergio Rodrigues, Voreppe (FR)

(73) Assignee: Xenocs S.A., Sassenage (FR)

( * ) Notice: Subject to any disclaimer, the term of this patent is extended or adjusted under 35 U.S.C. 154(b) by 807 days.

(21) Appl. No.: 10/577,522

(22) PCT Filed: Nov. 29, 2004

(86) PCT No.: PCT/EP2004/053158
§ 371 (c)(1),
(2), (4) Date: Apr. 27, 2006

(87) PCT Pub. No.: WO2005/051626
PCT Pub. Date: Jun. 9, 2005

(65) Prior Publication Data
US 2007/0035068 A1    Feb. 15, 2007

(30) Foreign Application Priority Data
Nov. 28, 2003   (EP) .................................... 03354086

(51) Int. Cl.
*B29C 41/46* (2006.01)
(52) U.S. Cl.
USPC ........................................................ 264/319
(58) Field of Classification Search
USPC .................................. 264/338, 2.5, 219, 319
See application file for complete search history.

(56) References Cited

U.S. PATENT DOCUMENTS

| | | | |
|---|---|---|---|
| 4,515,828 A * | 5/1985 | Economy et al. | 427/129 |
| 4,690,370 A | 9/1987 | Skinner | |
| 5,505,808 A * | 4/1996 | Hallman et al. | 156/233 |
| 5,662,999 A | 9/1997 | Taniguchi et al. | |
| 5,723,174 A | 3/1998 | Sato | |
| 5,838,506 A | 11/1998 | Kimura et al. | |
| 5,855,966 A * | 1/1999 | Richards | 427/524 |
| 6,156,243 A | 12/2000 | Kosuga et al. | |
| 2002/0145740 A1 * | 10/2002 | Meeks | 356/630 |

FOREIGN PATENT DOCUMENTS

| | | |
|---|---|---|
| EP | 0 670 576 | 9/1995 |
| EP | 1 229 356 | 8/2002 |

(Continued)

OTHER PUBLICATIONS

International Search Report for PCT/EP2004/053158, International Filing Date of Nov. 29, 2004.

(Continued)

*Primary Examiner* — Larry Thrower
(74) *Attorney, Agent, or Firm* — Marger Johnson & McCollom PC

(57) ABSTRACT

In a method for producing a replication master (10) having a surface with low roughness, comprising the steps of forming said master (10) such as to have a desired external surface shape corresponding to a counterform of a surface of an object (18, 20) to be produced by replication and treating said external surface of said master (10) to obtain a predetermined surface roughness value, it is proposed that said method furthermore comprises the step of coating at least a part of said master (10) with a soluble smoothening layer (16). The invention further relates to a replication master (10) for producing a smooth object (18, 20) having a low surface roughness, wherein at least a part of said master (10) is coated with a soluble smoothening layer (16).

26 Claims, 4 Drawing Sheets

FOREIGN PATENT DOCUMENTS

| | | |
|---|---|---|
| GB | 1 167 690 | 10/1969 |
| GB | 1 045 016 | 10/1996 |
| JP | 59135133 A | 8/1984 |
| JP | 60073817 A | 4/1985 |
| JP | 01269029 A | 10/1989 |
| JP | 5-16147 | 1/1993 |
| JP | 05016146 A | 1/1993 |
| JP | 07072315 A | 3/1995 |
| JP | 07138033 A | 5/1995 |
| JP | 09301722 A | 11/1997 |
| JP | 10 337734 A | 3/1999 |

OTHER PUBLICATIONS

Romaine, S. et al., Progress in Replication of Substrates for Multilayer Coatings, SPIE Conference on X-Ray Optics, Instruments, and Missions, Jul. 1998, pp. 564-568, SPIE vol. 3444, 0277-786X/98, San Diego, CA.

Hudec, Rene, et al., Replicated Grazing Incidence X-Ray Optics, X-Ray Optics, Instruments, and Missions III, 2000, pp. 422-431, SPIE vol. 4012.

* cited by examiner

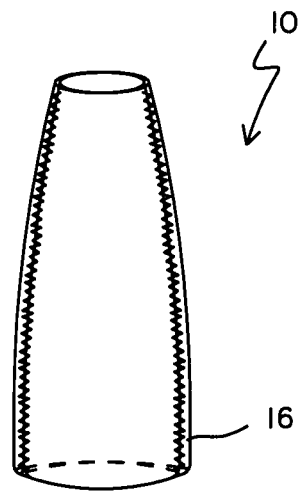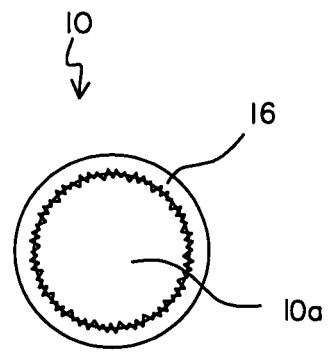
FIG. 4a  FIG. 4b
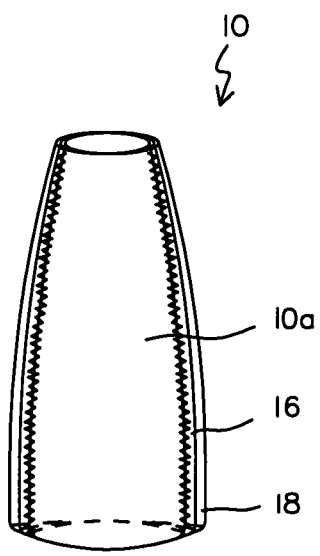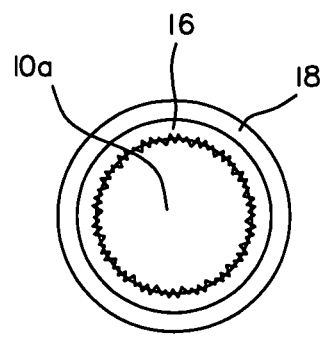
FIG. 5a  FIG. 5b

METHOD FOR PRODUCING A REPLICATION MASTER, REPLICATION METHOD AND REPLICATION MASTER

The present invention relates to a method for producing a replication master having a surface with low roughness, comprising the steps of forming said master such as to have a desired external surface shape which at least partially corresponds to a counterform of a surface of an object to be produced by replication, and treating said external surface of said master to obtain a predetermined surface roughness value.

Such a method is for example known from document U.S. Pat. No. 4,525,853. This document describes the case of a replication master which is to be used for producing an X-ray focussing mirror comprising a plurality of layer pairs for reflecting and simultaneously focussing X-rays.

As described in this prior art document, the master is made from a metal material resembling a cone, the external surface shape of which corresponds to the curved counterform of the surface of the mirror to be produced by replication.

This replication process which follows the preliminary production of the replication master essentially comprises coating the master with suitable mirror materials, for example by molecular beam epitaxy (MBE) deposition or other deposition methods well-known in the field of monolayer or multilayer production.

As is also well-known, the master surface on which these layers are grown, has to be as smooth as possible in order to grow smooth layers having a low surface and interface roughness which negatively effects the mirrors reflectivity.

In order to provide the master surface with the desired shape, namely the counterform of the object to be produced, and to simultaneously reduce the roughness of the master surface the prior art therefore proposes to treat the master surface by diamond turning. As is well-known, diamond turning leads to surfaces which look smooth on a macroscopic scale, but today the optimum roughness obtainable by this method is in the order of 20 Angströms (root mean square, rms) and thus still much too high to deposit monolayers, bilayers or multilayers for optical purposes on such a master like for example for producing X-ray optics and other high performance optics. In general, it is desired to deposit monolayers on a substrate having a roughness of not more than approximately 5 Angströms in order to limit the surface roughness of such monolayers. For the deposition of bi- or multilayers, one has to take into account that the interfacial roughness between consecutive layers may increase, so that the surface of the topmost layer will have a roughness which significantly exceeds the roughness of the substrate on which the entire assembly is deposited. It is therefore in general desired to use substrates having a surface roughness of less than approximately 5 Angströms (rms) for the deposition of bi- or multilayers.

The prior art therefore proposes a second kind of surface treatment to be applied, namely mechanically polishing the diamond turned master surface. This mechanical polishing can reduce the roughness of the master surface to values of approximately 5 Angströms or less, so that the master can then successfully be used for the production of optical components by replication.

However, the necessary polishing or superpolishing operation is extremely time-consuming, difficult and therefore expensive.

It is therefore an object of the present invention to improve a method for producing a replication master as known from the prior art in such a way that a roughness of the master surface in the order of only some Angströms can be obtained without any mechanical polishing.

According to the invention this object can be achieved when said method comprises the step of coating at least a part of said master with a soluble smoothening layer.

At the end of the object production process, the object can easily be separated from the master by immersing the master with the object on top in a solvent which is suitably chosen to dissolve the smoothening layer. In case of a smoothening layer made of a PMMA photoresist, acetone can be chosen as such a suitable solvent.

This smoothening layer is a layer which due to a certain flowability of its material displays a smaller roughness at its top surface than the surface on which it has been grown, in contrast to for example ordinary metallic monolayers, the surface of which usually displays a larger roughness than the surface of the substrate on which they have been grown.

Thus, according to the invention a diamond turned master surface having a roughness of approximately 20 Angströms can be coated with such a smoothening layer displaying a roughness of only 5 Angströms or less after the end of the coating step. The surface of the smoothening layer then forms the new smooth master surface.

Advantageously, said smoothening layer is applied by dip-coating or spin-coating a liquid smoothening material on said master and hardening said smoothening material. Dip-coating and spin-coating are well-known technologies and will therefore not be described in detail. It should, however, be pointed out that these coating techniques are much less time-consuming to realise than the polishing or superpolishing techniques proposed in the prior art.

As is well-known in the field of replication, and for example also explained in the above-discussed prior art document U.S. Pat. No. 4,525,853, the object to be produced by replication is formed on the smooth master surface and has to be released at the end of the production operation. In an embodiment, the method according to the invention can therefore comprise the step of coating at least a part of said master with a release layer. This release layer is then chemically or mechanically removed when production of the object is terminated, so that contact between the master and the object gets lost and the cone-shaped master can be pulled out of the surrounding object. In case the release layer is deposited on top of the smoothening layer, the master can therefore be recovered with the smoothening layer still being on top of the master surface, so that the smooth master can immediately be re-used for the production of another object in a next replication cycle.

However, it is also possible to provide the release layer between the master core and the smoothening layer. In this case only the core of the master will be recovered, whereas the smoothening layer will stick to the object separated from the master. The smoothening layer may then have to be removed from the object.

In an advantageous embodiment, the smoothening layer takes over the role of the release layer thus preventing from the coating of a release layer.

In a particularly advantageous embodiment said release layer is made of a soluble material, in particular a soluble polymer material, for example a PMMA photoresist. At the end of the object production process, the object can then easily be separated from the master by immersing the master with the object on top in a suitable solvent. In case of a smoothening layer and/or release layer made of a PMMA photoresist, acetone can be chosen as such a suitable solvent. Of course the release layer can be made from a different material compared to the soluble smoothening layer. Correspondingly the respective solvents can be different, which offers the following advantage: one may coat the replication master with a soluble smoothening layer made from a first material which is soluble in a first solvent, and may then provide a release layer made from a second material which is soluble in a second solvent. During "ordinary" production of smooth objects, for example optical mirrors, the spatial separation of the mirrors from the master may be realized by dissolving the second material, i.e. the release layer. In contrast hereto the smoothening layer may remain unaffected on the replication master as long as it maintains the required smoothness. However, whenever the smoothening layer starts to deteriorate, for example after a large number of production cycles, it may become necessary to replace the smoothening layer itself. This can then be done by dissolving the smoothening layer in the above-mentioned first solvent.

The applicant has discovered that the smoothness of the replication master increases with the thickness of the smoothening layer according to the invention, but the shape deterioration is also increased in case a single smoothening layer with large thickness is provided on the replication master in one single deposition step. In particular the applicant has observed the development of a certain waviness on top of thick smoothening layers, i.e. a long-scale modulation of the average surface height which does not correspond to the surface shape of the replication master and which has to be removed before starting the actual replication process. In this context, the term "shape deterioration" refers to differences between the external surface with low roughness on which a smooth object is to be produced, and the initially chosen external shape of the replication master. An advantageous embodiment of the present invention therefore comprises after the step of coating a soluble smoothening layer with a reduced thickness compared to the thickness necessary to smooth efficiently the master with one single deposition step, the further step of coating at least one additional smoothening layer also with a reduced thickness on top of or under said soluble smoothening layer.

In other words, instead of coating the master with one thick smoothening layer it has turned out to be preferable to rather divide this step into several coating substeps and to provide at least one additional smoothening layer on top of or below the soluble smoothening layer according to the invention, which can then have a reduced thickness.

In principle the main soluble smoothening layer and all additional smoothening layers could be made of identical materials. However, it is also possible that at least one of said additional smoothening layers is made of a non-soluble material. One may for example choose a non-soluble additional smoothening layer directly on top of the replication master, i.e. below said soluble smoothening layer. This non-soluble additional smoothening layer may then remain on the replication master for quite a long time, corresponding to many production cycles, whereas the soluble smoothening layer is replaced in more frequent intervals.

In an even further improved embodiment the method according to the invention furthermore comprises the step of coating a thin spacer layer, preferably a thin metallic spacer layer, between at least two adjacent smoothening layers. This method has turned out to be helpful in order to optimize the application of the additional smoothening layers on each other and on the main soluble smoothening layer. In particular coating smoothening layers which are made of polymer materials on each other can be a problem because of bad wetting characteristics and may considerably be improved by providing such thin metallic layers between adjacent smoothening layers.

As examples for non-soluble materials which may be chosen to form said non-soluble additional smoothening layers, Spin on Glass Coatings or Sol Gel coatings can be mentioned.

In all the above-described embodiments, the method for producing a replication master according to the invention leads to a master having an extremely smooth surface, which is formed either by the smoothening layer or the release layer, so that one can then easily continue the method for producing the replication master to a complete replication method for producing a smooth object having a low surface roughness, comprising the steps of producing a replication master by a method according to any of the above-discussed embodiments, coating at least a part of said master with an object material such that the surface of said object corresponds to a counterform of said master, and releasing said object from said master.

The releasing step can in principle be executed by cooling the master so that it shrinks more than the surrounding object.

Advantageously, however, said releasing step comprises dissolving said smoothening layer and/or said release layer on top of said master by a solvent. As already explained above, acetone may be chosen as a suitable solvent for example in the case of a smoothening layer and/or a release layer made from a polymer material, for example a PMMA photoresist. The releasing step may be assisted or accelerated by mechanical measures, for example moving the master with the object on top in the solvent bath or even gently pushing the object in order to initiate a crack in the soluble smoothening layer and/or the release layer. Additionally or alternatively the releasing step may be assisted or accelerated by exposing the assembly consisting of the replication master and the object on top to a sharp temperature variation.

No matter how the releasing step is realised, it leads to the separation of the master from the object produced by replication. In case of optical components to be produced, for example reflective multilayer mirrors for X-rays, EUV or IR or synchrotron radiation, laser light or neutrons, the object may be too thin and fragile to be used as a stand-alone device. It is therefore advisable to transfer the object produced on the master to a kind of substrate before separating it from the master. An advantageous improvement of the replication method for producing the smooth object according to the invention therefore comprises the step of providing glue to said object and/or to an object support and glueing them together before executing said releasing step. By doing so the object can be stably transferred to the object support before executing the releasing step, i.e. before separating the object from the master. In the above-discussed case in which the releasing step comprises dissolving the smoothening layer and/or the release layer by a solvent, this means that the entire set-up of the master with the newly produced object on top and the object support glued to them is immersed into the solvent. In this case it is of course important to make sure that the glue itself is not attacked by the solvent in order not to lose the stable contact between the object and the object support.

The amount of glue used in this embodiment can be chosen such as to fill gaps between said object and said object support. This leads to the following advantage provided by the method according to the invention:

Replication methods used for producing optical devices are usually based on cone-shaped replication masters onto which the optical device, i.e. the object, is grown. One can imagine the object as a kind of circumferential "skin" of the cone-shaped master, which then has to be transferred to the object support. Usually the object support therefore has to be rather precisely preshaped to have an external shape which more or less corresponds to the counterform of the object.

This involves preliminary machining steps during the production of object supports, and in particular different kinds of object support have to be prepared for different kinds of objects to be transferred to these supports, e.g. objects having different sizes. With the above-proposed possibility of choosing the amount of glue such as to fill gaps between the object and the object support, it is sufficient to less precisely pre-shape each individual object support or even to only provide one type of object support corresponding to the largest type of object, and smaller objects can be carried by such an object support, e.g. in a recess of the support, by simply filling more glue into this recess. In particular use of locally varying amounts of glue such as to fill gaps between said object and said object support may allow to use an object support having an external shape which does not correspond to the counterform of the object. For example the external shape of the recess in the object support may be less curved than the counterform of the object, which may assist in controlling flow of the glue in said recess.

It should be mentioned, however, that in alternative embodiments one may choose other ways to attach the object to the object support, for example in case one of the materials in use is not compatible with glue. Thus one may rely on molecular adhesion between the object and the object support, or alternatively an eutectic solder or braze can be applied to the object and/or to the object support, and low temperature and/or low pressure is applied to allow soldering or brazing the object support to the object when it is still mounted on top of the replication master. One advantage of such a process may be the thermal stability of the object once it has been transferred to the object support or even the stability under damaging radiation such as X-ray radiation.

As already mentioned before, in one embodiment of the replication method according to the invention, said object is an optical device, e.g. a reflection or transmission monolayer, bilayer or multilayer. Without any limitation, one can e.g. mention Au monolayers, W/Si multilayers, PVC multilayers, Mo/Si multilayers etc. as such optical devices, which are commonly used in X-ray, EUV or synchrotron scattering applications, for example macromolecular X-ray crystallography or X-ray diffraction analysis.

Even though the method according to the invention allows to obtain a smooth master, and the subsequent steps of the replication method for producing the object are in principle well known, exceptional disturbances may occur either during coating the master with the smoothening layer or during the subsequent deposition of the object on the smoothened master surface. Regardless of whether these disturbances are mechanical or chemical in nature, they will negatively affect the surface profile of the object and/or its optical behaviour. It would of course be extremely inefficient to discover e.g. a disturbance due to an irregular smoothening layer only after having released the entire finished object from the master. In a further development it is therefore proposed that the replication method according to the invention furthermore comprises the step of characterising said optical device on top of said master before executing said releasing step, wherein said characterisation step may e.g. comprise performing a profilometry and/or a reflectometry measurement of said optical device. Whereas profilometry analyses the surface shape of the object, reflectometry will directly yield information about its optical behaviour. Such a characterisation should be made when a multilayer object is finished and it can even be made after the first few layers of the multilayer object have been deposited on the master surface. If during this characterisation important disturbances are observed, one can immediately interrupt the further production of the object, separate the object as it is at that time from the master and start a new replication cycle. In other words, one can e.g. coat the master with a fresh smoothening layer and restart the deposition of the first layers of the multilayer object, thus avoiding unnecessary production steps in order to save time and cost. This is particularly advantageous when the releasing step is executed chemically by means of a solvent dissolving the release layer or the smoothening layer which in this case simultaneously takes over the role of a release layer, indeed one may increase the life time of the master compared to a mechanical releasing step.

The latter embodiments were based on the assumption that the object deposited on the master is the optical device to be produced itself. In an alternative embodiment of the replication method according to the invention, however, the object can be a substrate for an optical device. In this case the replication method serves to produce an extremely smooth substrate. By means of the above-discussed transfer step of providing glue to the object and/or to an object support and glueing them together before releasing the object from the master, this extremely smooth substrate can be stably transferred to an object support which in this case takes the role of a substrate holder. This extremely smooth substrate produced by replication may then be used for the deposition of an optical device like e.g. an X-ray multilayer by well-known deposition methods. In order to avoid any complications due to incompatible materials or in order to reduce the number of steps it is then recommended that the object material and the material of said glue are identical. In this case it may be completely sufficient to coat the smoothened master with a thick layer of glue and to attach the thus prepared master with the glue layer on top to an object support. After hardening of the glue and removal of the smoothening layer and/or the release layer and subsequent removal of the master, the object support will have an extremely smooth substrate made from hardened glue on top, the external shape of which corresponds to the counterform of the smoothened master surface.

Advantageously said object material and said glue comprise epoxy resin. This material can be easily applied to the smoothened master surface and/or the support surface in its liquid state, and after hardening it will serve as a stable substrate on which an optical multilayer may be deposited. Prior to its application to the master and/or to the support surface it may be helpful to degas said epoxy in vacuum in order to reduce the number of air bubbles within said epoxy resin.

In a further development of this latter embodiment, in which the replication method according to the invention is used to produce an extremely smooth substrate, the method may furthermore comprise the step of coating at least a part of said master with a protection layer on top of said smoothening layer or release layer before applying said object material. This option may in particular be taken advantage of if there is a risk that the smoothening layer will be negatively affected by direct contact with the epoxy resin or other glue or that the epoxy resin or other glue may be attacked by the solvent. The protection layer can therefore be used to protect the epoxy resin or other glue during the releasing step and subsequent deposition steps. This protection layer may e.g. be a thin metal layer. As it is directly deposited on the smoothening layer or on the extremely smooth release layer, it will also display an extremely low surface roughness on its top surface, so that it also represents a smooth substrate for the further deposition of an optical device after the releasing step.

The invention furthermore relates to a replication master for producing a smooth object having a low surface roughness, said master having an external surface shape which at least partially corresponds to a counterform of a surface of said object, characterised in that at least a part of said master is coated with a soluble smoothening layer.

As explained above, this replication master can be produced by the method according to the invention. Such a smoothened replication master can in general be used for any kind of replication production method without any limitation to the field of optical devices or other monolayers, bilayers or multilayers.

Furthermore, such a replication master according to the invention can at least partially be coated with a release layer in order to facilitate release of a future object produced by replication from the master itself.

Finally, in an advantageous embodiment said smoothening layer and/or said release layer is made of a soluble material, in particular a soluble polymer material, for example a PMMA photoresist.

In the following some advantageous embodiments of the method according to the invention will be illustrated with reference to the accompanying drawings in which:

FIG. 3b is a front view of the broad, end of the master in FIG. 3a;

FIG. 4a is a schematic perspective view of the master in FIG. 3a after coating with a smoothening layer;

FIG. 4b is a front view of the broad end of the master in FIG. 4a;

FIG. 5a is a schematic perspective view of the master in FIG. 4a after additional coating with an optical monolayer;

FIG. 5b is a front view of the broad end of the master in FIG. 5a;

FIG. 6b is a front view of the broad end of the master and object support in FIG. 6a;

Figure 1:
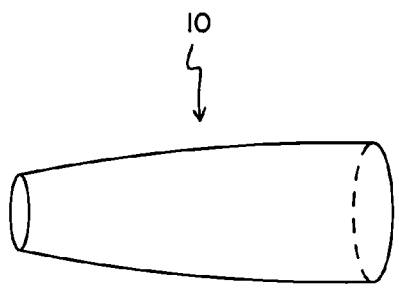
FIG. 1 shows a perspective view of an ideal cone-shaped replication master.

FIG. 1 shows a perspective view of an ideal replication master 10 used for the production of aspherical optical devices, for example monolayers, bilayers or multilayers, which are used as mirrors in X-ray, EUV, synchrotron or neutron scattering research. The master 10 is typically made from metal material and is cone-shaped, so that an object, in particular an optical device deposited on the master surface will have the desired curvature for focussing and/or collimating purposes.

Figure 2:
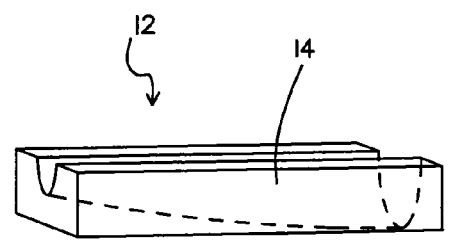
FIG. 2 shows a perspective view of a corresponding object support.

The optical layer deposited on the surface of the master 10 will finally be transferred to an object support 12 shown in FIG. 2. This object support 12 can be a rectangular block of metal or other stable material having a length corresponding to the axial length of the master 10 and being provided with a recess 14 the shape of which corresponds to a counterform of a part of the external surface of the master 10. For example, as shown in FIGS. 1 and 2, the recess 14 in the object support 12 is approximately shaped such that it can receive half of the master 10 when inserted into recess 14, the other half of the master 10 protruding from the object support 12.

Figure 3A:
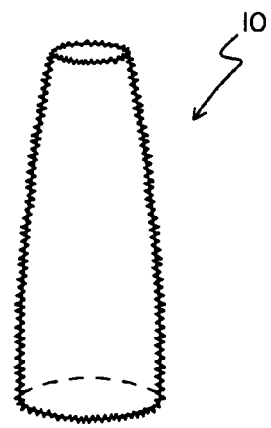
FIG. 3a shows a perspective view of a real replication master having a rough surface.
Figure 3B:
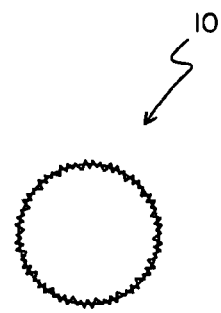

In the field of optical device production it is well-known that the idealistic representation of the master 10 having smooth surfaces in FIG. 1 does not correspond to reality when produced by the shaping processes described above, e.g. diamond turning. Rather the master 10 has to be imagined as having rough surfaces, as is schematically shown in the perspective view of FIG. 3a and in the front view of the broad end of the cone-shaped master 10 in FIG. 3b. Even after diamond turning the surface roughness of the master 10 will still be in an order of magnitude of approximately 20 Å. Directly depositing an optical monolayer, bilayer or multilayer on top of such a rough master 10 would yield surface and interface roughness values of the optical layer(s) in at least the same order of magnitude reducing their reflectivity to values which would prevent their use in modern optical devices for research or industrial purposes.

According to the invention, the rough master 10 is therefore coated with a smoothening layer 16. The smoothening layer 16 can for example be applied by dip-coating, i.e. dipping the master 10 into a tank containing the smoothening layer material and removing the master 10 from the tank. It is of course also possible in order to apply the smoothening layer on the master to dip the master into the tank and then evacuate the tank through a valve or cock in or close to its bottom surface in order to slowly remove the smoothening material from the tank possibly through a flow meter. If necessary, it is possible to cure the thin layer 16 which adheres to the master surface, for example by special thermal treatment well known in the art. After this hardening process the surface of the smoothening layer 16 has a much smaller roughness as the master surface on which it has been grown. The hardened and smooth surface of the smoothening layer 16 therefore forms an ideal basis for the deposition of an optical monolayer, bilayer or multilayer.

As suitable smoothening layer materials a liquid and curable polymer, in particular a PMMA photoresist can be chosen.

It is to be noted that the schematic views in FIG. 4a (perspective view) and in FIG. 4b (front view) are not to scale. In the front view of FIG. 4b, for example, the smoothening layer 16 surrounding the metallic master core 10a is expanded in size for illustrative purposes. In reality the thickness of the smoothening layer 16 will e.g. amount to some micrometers, so that the width of the entire master 10 is still dominated by its master core 10a on top of which the smoothening layer 16 is deposited.

FIGS. 5a and 5b schematically show the result of the next step of the replication method according to an embodiment of the invention. In these figures, the master 10 shown in FIG. 4a and 4b has, for reasons of simplicity, been coated with only one additional layer 18, for example a gold layer to be used as a reflecting mirror. This deposition of the gold layer 18 can for example be realised by a physical vapour deposition method such as magnetron sputtering deposition or ion beam sputtering or by molecular beam epitaxy (MBE) deposition or by chemical vapour deposition. In FIG. 5a and 5b the gold layer completely surrounds the entire circumferential surface of the master 10, i.e. the entire smoothening layer 16. However, it is generally possible to limit the deposition of the gold layer 18 to only a part of the master's surface. In this case, it is also generally possible to limit the deposition of the smoothening layer 16 on top of the master core 10a to only those regions of the master 10 which will subsequently be used for the gold layer deposition. In both cases one can obtain a highly curved gold mirror having the desired curvature for focussing and/or collimating purposes by a gold deposition on a convex replication master surface avoiding possible shadowing problems when directly depositing on the final concave substrate.

In the following steps of this embodiment of the method according to the invention, the optical layer 18 produced on top of the master 10 has to be transferred to the object support 12 shown in FIG. 2, more precisely into its correspondingly shaped recess 14.

Figure 6A:
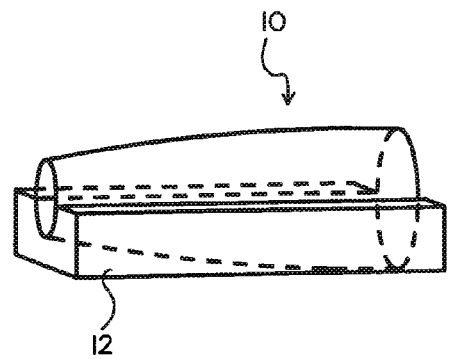
FIG. 6a is a schematic perspective view of the master in FIG. 5a glued to the object support in FIG. 2.

For this purpose, the external surface of the optical layer 18 shown in FIGS. 5a and 5b and/or the surface of the recess 14 are provided with an epoxy glue, the master 10 with the optical layer 18 on top is inserted into the recess 14 as schematically shown in the perspective view of FIG. 6a, and the glue layer forming in the recess 14 and fixing the master 10 with the optical layer 18 on top to the object support 12 is allowed to harden.

Figure 6B:
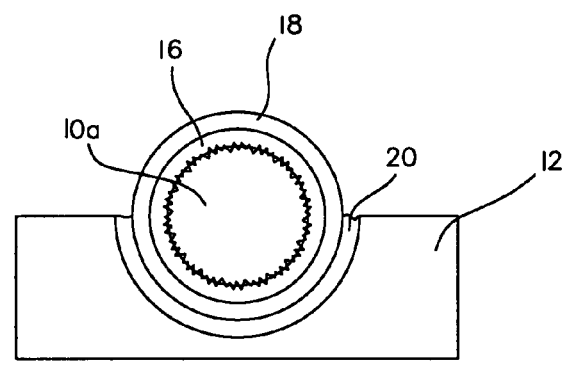
Figure 7:
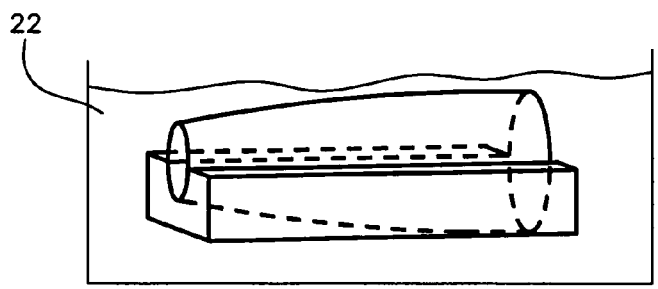
FIG. 7 is a schematic perspective view illustrating the releasing step of the method according to the invention.

FIG. 6b shows a schematic front view of the master 10 and the object support 12 after executing this glueing step according to the invention. An epoxy glue layer 20 bonds the object support 12 to the optical layer 18 surrounding the smoothening layer 16 which in turn surrounds the master core 10a. Again it has to be pointed out that FIG. 6b is not to scale, and that all layer thicknesses are considerably exaggerated for clarity purposes. As mentioned above, the smoothening layer 16 will for example have a thickness of several micrometers. The thickness of the optical layer 18, however, may only amount to several nanometers in case of a monolayer or some hundred of nanometers or even some micrometers in case of a complicated optical multilayer 18, for example a W/Si multilayer for X-ray crystallography or a Co/Ti supermirror to be used as a polarising mirror for neutron reflection. The glue layer 20 bonding the optical layer 18 to the support 12, however, may have a thickness of several millimeters (or some hundred of micrometers). In a particularly advantageous embodiment of the invention the epoxy glue layer 20 may even have different thickness values at different axial positions of the master 10. This allows to avoid any time-consuming pre-shaping of the recess 14 provided in the object support 12:

In this case, the object support 12 can be provided with a simple rectangular recess 14, the length of which approximately corresponds to the axial length of the master 10, and the width of which is slightly larger than the width of the broad end of the master 10 (the right end of the master 10 in FIG. 1). One can then simply fill the rectangular recess 14 with epoxy glue up to a suitable level and immerse the master 10 with the optical layer 18 on top into the glue, leading to a small width of the epoxy glue layer 20 close to the broad end of the master 10 and to a larger thickness of the epoxy glue layer 20 close to the small end of the master 10.

After hardening of the glue layer 20 the master 10 has to be removed from the optical layer 18, in order to complete its transfer to the object support 12.

Figure 8:
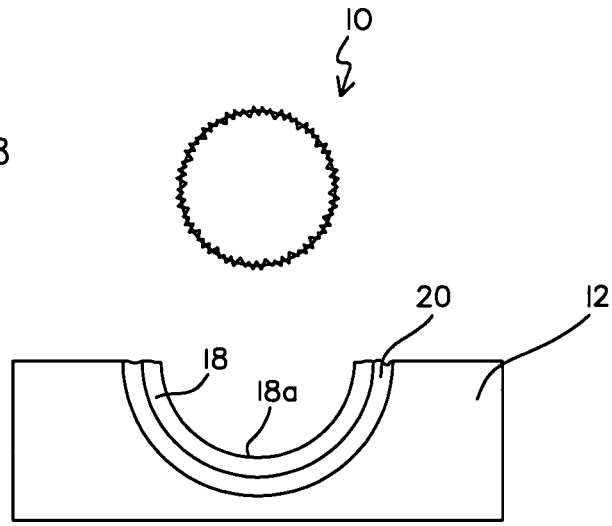
FIG. 8 is a schematic front view illustrating removal of the replication master from the object and object support in FIG. 6b after the releasing step.

This releasing step is realised by immersing the entire set-up shown in FIGS. 6a and 6b into a tank 22 filled with a solvent, for example acetone. The solvent dissolves the smoothening layer 16, for example the PMMA photoresist. The entire set-up is then carefully taken out of the tank 22. As shown in FIG. 8, the optical layer 18 is still firmly bonded to the object support 12 by the glue layer 20, whereas the replication master 10 is no longer connected to the optical layer 18 as the connecting smoothening layer 16 has been dissolved. The master 10 can therefore easily be removed. It is to be noted, that the upper half of the optical layer 18 shown in FIG. 6b is no longer shown in FIG. 8. It can be cut away during removal of the master 10. As the smoothening layer 16 has been completely removed, it is not part of the final optical device and therefore not exposed to any radiation during subsequent use of the device, thus avoiding stability problems.

The master 10 can subsequently be coated with a new smoothening layer 16 in order to begin a new replication process for producing another optical device. The upper surface 18a of the optical layer 18 shown in FIG. 8 can now be used as a focussing reflecting mirror for X-rays or other radiation. As becomes clear by comparing FIG. 8 with FIG. 6b, this reflecting surface 18a has always been in contact with the outer circumferential surface of the smoothening layer 16, and will therefore have a small roughness of only some Å leading to a good mirror reflectivity. If the layer 18 is a multilayer, it gets clear from FIG. 8 that its topmost layers have been directly grown on the smoothening layer 16, so that these topmost layers, the adjacent layers which have been deposited on them as well as their interfaces will have excellent roughness values. This is an advantage of using such a replication method for optical purposes as generally the top layers of a multilayer have the higher potential contribution to the reflected field because of less absorption.

Figure 9:
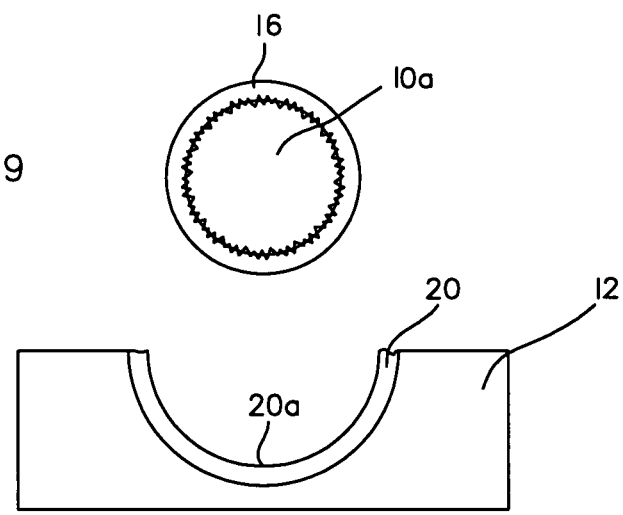
FIG. 9 is a schematic view similar to FIG. 8 in the case of an alternative embodiment of the method according to the invention.

FIG. 9 shows a front view similar to FIG. 8 at the end of an alternative embodiment of the method according to the invention. This alternative embodiment differs from the embodiment described in connection with FIGS. 3 to 8 in two different aspects:

In the first place, the embodiment illustrated in FIG. 9 uses a smoothening layer 16 which is not attacked by the solvent in the tank 22. Instead, at the beginning of the master production process according to this embodiment of the invention, the master 10 has been coated with an additional release layer surrounding the smoothening layer 16. This release layer has later on been dissolved by the solvent in the tank 22 and is therefore not shown in FIG. 9.

As a further essential difference between the embodiment illustrated in FIG. 9 and the first embodiment described above, the object produced by replication in this alternative embodiment is not an optical layer itself, but rather the epoxy glue layer 20. In this case, the master 10 with the smoothening layer 16 surrounding the master core 10a and the release layer surrounding the smoothening layer 16 is directly coated with the epoxy or other glue in the way described above, for example by immersing the master 10 in highly flowable heated epoxy glue provided in the recess 14 of the object support 12. The epoxy glue is then again allowed to cure. After this intermediate step, the entire set-up comprising the master 10 and the object support 12 bonded to each other by means of the glue layer 20 is again immersed in the tank 22 containing a solvent which only dissolves the release layer. The master 10 still having the smoothening layer 16 on top is then removed from the object support 12 as shown in FIG. 9, leaving the glue layer 20 bonded to the object support 12. In this case it is the upper glue layer surface 20a of the glue layer 20 which has constantly been in contact with the outer circumferential surface of the meanwhile dissolved release layer, so that the upper surface 20a is extremely smooth and has the desired surface shape, and can therefore successfully be used as a substrate for the deposition of an optical monolayer, bilayer or multilayer. This deposition is then executed on a substrate the shape of which is a counterform of the master surface, so that after the optical layer deposition one obtains a suitably curved focussing and/or collimating aspherical mirror.

The replication master producing method according to the invention as well as the entire method for producing a smooth optical device or a smooth substrate according to the invention are not at all limited to the above embodiments. The master core 10a may have a different shape, for example any spherical or aspherical shape like an ellipsoid, a paraboloid or a cylinder, and may be made from a non-metallic material, for example glass. The master may have a revolution shape but is not limited to such case. Moreover the master may be composed of several external surfaces (this term meaning in the present text that it presents one or several second degree discontinuities such as crests or angular points, salient or hollow). Similarly the object support 12 can be made by any sufficiently stable material, and the recess 14 may in general either be pre-shaped to an approximate counterform of the master 10, or may have a simpler and slightly larger shape, so that gaps between the object support 12 and the master received in the recess 14 are filled with glue during the production method according to the invention. In another embodiment, the transfer of the object, surrounding the smooth master, to the object support 12 prior to the releasing step can be done by means of molecular adhesion.

As mentioned above, the release layer used in the second embodiment illustrated in FIG. 9 could also be provided between the layer core 10a and the smoothening layer 16. In this case as well as in the case shown in FIG. 9 the release layer may be soluble.

Furthermore it has to be pointed out that the releasing step need not necessarily be realised chemically by means of a solvent. One can conceive removing the master 10 from the object support 12 at the end of the replication method according to the invention by cooling and shrinking the master 10.

Furthermore, in the case of the production of an optical device, it has to be pointed out that an additional layer such as a radiation protection layer may be applied to the master surface prior to a glueing process with the object support in order to protect the glue during any later operation of the object which can cause damages to the glue for example in the case of X-ray application.

Furthermore, as explained in the introduction, the method according to the invention may comprise profilometry and/or reflectometry characterisation of an optical layer 18 deposited on the master 10. In this case the object support 12 should be chosen such as to be easily mountable in a profilometry or reflectometry apparatus, for example on a goniometer table of an X-ray reflectometer.

Finally it has to be pointed out that although in the above description of the method according to the invention, the step of coating at least a part of the master with a smoothening layer is an additional step executed after the step of treating the master surface by diamond turning, this diamond turning step for treating the master surface could also be completely skipped. Furthermore one could also execute additional surface treatment steps between diamond turning and before applying the smoothening layer, e.g. short polishing.

The invention claimed is:

1. A replication method for producing a smooth object (18, 20) having a low surface roughness, comprising the steps of:
   producing a replication master (10) by:
      forming said master (10) such as to have a desired external surface shape which at least partially corresponds to a counterform of a surface of an object (18, 20) to be produced by replication;
      treating said external surface of said master (10) to obtain a predetermined surface roughness value; and
      coating at least a part of said master (10) with a removable smoothening layer (16) made of a polymer material which has a flowability such that the top surface of said smoothening layer displays a smaller roughness than the surface on which it is formed and which is soluble after being formed on said master (10);
   coating at least a part of said smoothening layer (16) on said master (10) with an object material such that the surface of said object (18, 20) corresponds to a counterform of said master (10); and
   releasing said object (18, 20) from said master (10).

2. The method according to claim 1, wherein said releasing step comprises dissolving said smoothening layer by a solvent.

3. The method according to claim 1, which furthermore comprises the step of providing glue (20) to at least one of said object (18, 20) and an object support (12) and gluing them together before executing said releasing step.

4. The method according to claim 3, wherein the amount of said glue (20) is chosen such as to fill gaps between said object (18, 20) and said object support (12).

5. The method according to claim 1, wherein said object (18) is a reflection or transmission monolayer, bilayer or multilayer.

6. The method according to claim 5, which furthermore comprises the step of characterizing said reflection or transmission monolayer, bilayer or multilayer on top of said master (10) before executing said releasing step.

7. The method according to claim 6, wherein said characterization step comprises performing a profilometry or reflectometry measurement of said reflection or transmission monolayer, bilayer or multilayer.

8. The method according to claim 1, wherein said object (20) is a substrate (20a) for an optical device (18).

9. The method according to claim 8 and claim 3, wherein said object material and the material of said glue (20) are identical.

10. The method according to claim 9, wherein said object material and said glue (20) comprise epoxy resin.

11. The method according to claim 8, which furthermore comprises the step of coating at least a part of said master (10) with a protection layer on top of said smoothening layer (16) before applying said object material.

12. The method according to claim 1, wherein said smoothening layer (16) is applied by dip-coating or spin-coating said master (10) with a liquid smoothening material and hardening said smoothening material.

13. The method according to claim 1, which furthermore comprises the step of coating at least one additional smoothening layer on top of or under said soluble smoothening layer (16).

14. The method according to claim 13, wherein at least one of said additional smoothening layers is made of a non-soluble material.

15. The method according to claim 13, which furthermore comprises the step of coating a thin spacer layer between at least two adjacent smoothening layers.

16. The method according to claim 15, wherein the thin spacer layer is a thin metallic spacer layer.

17. The method according to claim 1, wherein the smoothening layer (16) has a roughness of 5 Angströms or less.

18. The method according to claim 17, wherein the smoothening layer (16) has a roughness of 5 Angströms or less after being coated on said at least a part of said master (10).

19. The method of claim 1, wherein the smoothening layer (16) has a thickness of several micrometers after being coated on said at least a part of said master (10).

20. The method according to claim 1 further comprising forming a release layer on top of said master.

21. The method according to claim 20, wherein said releasing step comprises dissolving the release layer on top of said master (10) by a solvent.

22. The method according claim 20, wherein said releasing step comprises removing the release layer on top of said master (10) and wherein the smoothening layer (16) remains substantially intact.

23. The method according to claim 20, which furthermore comprises the step of coating at least a part of said master (10) with a protection layer on top of the release layer before applying said object material.

24. The method according to claim 1 in which the smoothening layer is soluble after being formed on said master and after being hardened.

25. The method according to claim 20 in which releasing said object (18, 20) from said master (10) comprises a mechanical releasing of the release layer.

26. The method according to claim 25 in which the mechanical releasing comprises mechanically releasing the release layer by thermal contraction.

\* \* \* \* \*